United States Patent [19]

Hasegawa et al.

[11] Patent Number: 5,449,558

[45] Date of Patent: Sep. 12, 1995

[54] OPTICAL ARTICLE HAVING AN ANTIREFLECTION LAYER

[75] Inventors: Takafumi Hasegawa; Ko Aosaki; Fumiko Nonaka; Norihide Sugiyama; Aya Yamaguti; Hiroyuki Watanabe; Masaru Nakamura, all of Yokohama, Japan

[73] Assignee: Asahi Glass Company Ltd., Tokyo, Japan

[21] Appl. No.: 209,074

[22] Filed: Mar. 11, 1994

[30] Foreign Application Priority Data

| Mar. 12, 1993 | [JP] | Japan | 5-078905 |
| Oct. 7, 1993 | [JP] | Japan | 5-251546 |
| Dec. 8, 1993 | [JP] | Japan | 5-307825 |

[51] Int. Cl.⁶ .................................. B32B 27/28
[52] U.S. Cl. ................... 428/422; 428/421; 428/332

[58] Field of Search ............ 428/332, 421, 422; 359/601, 722

[56] References Cited

U.S. PATENT DOCUMENTS

| 5,139,879 | 8/1992 | Aharoni et al. | 428/422 |
| 5,246,782 | 9/1993 | Kennedy et al. | 428/421 |
| 5,278,694 | 1/1994 | Wheatley et al. | 359/359 |

*Primary Examiner*—Paul J. Thibodeau
*Assistant Examiner*—David Abraham
*Attorney, Agent, or Firm*—Oblon, Spivak, McClelland, Maier & Neustadt

[57] ABSTRACT

An optical article comprising a layer of a resin having self-healing properties and scuff resistance, and an antireflection layer of a non-crystalline fluorine-containing polymer.

14 Claims, No Drawings

OPTICAL ARTICLE HAVING AN ANTIREFLECTION LAYER

BACKGROUND OF THE INVENTION

1. Field of the Invention

The present invention relates to an optical article having antireflection properties imparted by a thin film and having self-healing properties and scuff resistance.

2. Discussion of Background

Heretofore, films have been produced in a large quantity by extrusion molding or casting of resins and have been used in a wide range of applications. Especially, in thin display devices such as liquid display devices, a plurality of phase difference films, light diffusing films or polarizing films are used at their light transmitting portions, and films constitute optical articles indispensable for the display function. Such films are usually continuously produced in relatively large sizes and cut into necessary sizes for use. Accordingly, it has been difficult to employ a conventional batch treatment method such as evaporation or sputtering to apply an antireflection treatment on the surface, since such a batch method is poor in the productivity.

On the other hand, an optical article made of a material such as glass or a resin is desired to have antireflection properties to reduce unnecessary reflection of lights and to improve the transmittance. It has been common to apply an antireflection treatment by forming a thin film by e.g. evaporation on the surface of such an optical article to impart such antireflection properties. However, many optical articles are in existence to which no antireflection treatment has been applied, mainly because of the cost. Especially when the optical article is of a large size, the cost for antireflection treatment is so high that it is common not to apply an antireflection treatment.

To solve such problems, it has been proposed in Japanese Unexamined Patent Publication No. 019801/1990 to use, as an antireflection treating agent, a polymer having a fluorine-containing aliphatic ring structures. This polymer has a low refractive index and is soluble in a certain specific fluorine type solvent, whereby it is possible to apply antireflection treatment to e.g. films in good productivity. However, the coated film of this polymer is soft as compared with the ,coated film of an inorganic material obtainable by evaporation or sputtering. Accordingly, the article having an antireflection layer formed by this polymer, has a drawback that it is susceptible to scratching when contacted with a hard object, and there will be a certain restriction in its use when it is employed as an exterior part of an apparatus.

SUMMARY OF THE INVENTION

It is an object of the present invention to solve the above-mentioned problems observed in the antireflection treatment of films and to provide an optical article excellent in the productivity and excellent in the self-healing properties and scuff resistance, which is hardly susceptible to scratching even when contacted with a hard object.

In view of the above problems, the present inventors have conducted extensive studies and as a result, have found a new that an optical article comprising a layer of a resin having self-healing properties and scuff resistance, and an antireflection layer of a non-crystalline fluorine-containing polymer, is excellent in the antireflection properties, the productivity and the scuff resistance.

Thus, the present invention has been accomplished on the basis of the above discovery and provides a novel optical article excellent in the self-healing properties and scuff resistance and having antireflection properties, which is hardly susceptible to scratching even when contacted with a hard object.

DETAILED DESCRIPTION OF THE PREFERRED EMBODIMENTS

Widely known as fluorine-containing polymers are, for example, a polytetrafluoroethylene resin, a perfluoro(ethylenepropylene) resin, a perfluoroalkoxy resin, a polyvinylidene fluoride resin, an ethylenetetrafluoroethylene resin and a polychlorotrifluoroethylene resin. However, many of such fluorine-containing polymers have crystalline nature, whereby light scattering occurs and the transparency is not good.

A non-crystalline fluorine-containing polymer is free from light scattering by crystals and thus is excellent in the transparency. Such a non-crystalline fluorine-containing polymer may, for example, be a fluoroolefin type copolymer such as a three component copolymer comprising from 37 to 48 wt % of tetrafluoroethylene, from 15 to 35 wt % of vinylidene fluoride and from 26 to 44 wt % of hexafluoropropylene, an alternating copolymer of chlorotrifluoroethylene and vinyl ether, a copolymer of tetrafluoroethylene with carboxyperfluorovinyl ether, a copolymer of tetrafluoroethylene with sulfonyl perfluoroethylene, a copolymer of 1,1-difluoroethylene with hexafluoropropylene, a copolymer of tetrafluoroethylene with propylene, a perfluoro polyether, or a polymer having fluorine-containing aliphatic ring structures. The polymer having fluorine-containing aliphatic ring structures, is particularly preferred, since it is excellent in the mechanical properties such as creep resistance. Preferred as the polymer having fluorine-containing aliphatic ring structures, is the one obtained by polymerizing a monomer having a fluorine-containing ring structure, or a polymer having ring structures in the main chain which is obtained by cyclic polymerization of a fluorine-containing monomer having at least two polymerizable double bonds.

A polymer having ring structures on its main chain which is obtainable by polymerizing a monomer having a fluorine-containing ring structure, is known from e.g. Japanese Examined Patent Publication No. 18964/1988. Namely, such a polymer can be obtained by homopolymerizing a monomer having a fluorine-containing ring structure such as perfluoro (2,2-dimethyl-1,3-dioxol), or by copolymerizing it with a radical polymerizable monomer such as tetrafluoroethylene.

A polymer having ring structures on its main chain which is obtainable by cyclic polymerization of a fluorine-containing monomer having at least two polymerizable double bonds, is known from e.g. Japanese Unexamined Patent Publication No. 238111/1988 or No. 238115/1988. Namely, such a polymer is obtainable by cyclic polymerization of perfluoro(allylvinyl ether) or perfluoro(butenylvinyl ether), or by copolymerizing it with a radical polymerizable monomer such as tetrafluoroethylene.

Otherwise, it may be a polymer obtainable by copolymerizing a monomer having a fluorine-containing structure such as perfluoro(2,2-dimethyl-1,3-dioxol) with a fluorine-containing monomer having at least two polymerizable double bonds, such as perfluoro(allylvinyl ether) or perfluoro(butenylvinyl ether).

As the polymer having fluorine-containing aliphatic ring structures, a polymer having ring structures on its main chain is preferred. A polymer containing at least 20 mol % of ring structures in the monomer units constituting the polymer, is preferred from the viewpoint of the transparency and mechanical properties.

As other non-crystalline fluorine-containing polymers, perfluoro polyethers of the following formulas Ka 1 and Ka 2 having reactive groups at both terminals and having a number average molecular weight of from 500 to 100,000, preferably from 1,000 to 10,000, may be mentioned. As the reactive groups, isocyanate groups capable of providing excellent adhesion to the self-healing scuff resistant film, are particularly preferred.

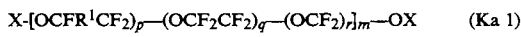

$$X\text{-}[OCFR^1CF_2)_p\text{—}(OCF_2CF_2)_q\text{—}(OCF_2)_r]_m\text{—}OX \quad \text{(Ka 1)}$$

wherein X is an organic group containing an isocyanate group, a hydroxyl group, an amino group, an epoxy group, an acrylate group, a methacrylate group, a cyanamide group or a maleimide group, $R^1$ is F or $CF_3$, and each of p, q, r and m is an integer.

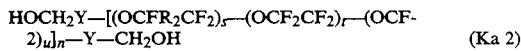

$$HOCH_2Y\text{—}[(OCFR_2CF_2)_s\text{—}(OCF_2CF_2)_t\text{—}(OCF_2)_u]_n\text{—}Y\text{—}CH_2OH \quad \text{(Ka 2)}$$

wherein Y is a perfluoroaliphatic group, $R^2$ is F or $CF_3$, and each of s, t, u and n is an integer.

As film-shaped optical articles among the optical articles of the present invention, a polarizing film, a light diffusing film, a phase difference film, a Fresnel lens film, a prism lens film and a lenticular film may, for example, be mentioned.

The polarizing film may be the one prepared by subjecting a film of e.g. triacetyl cellulose or polyvinyl alcohol to stretching treatment, followed by dyeing with iodine or a two-tone coating material. The polarizing film may be the one having fine toughening treatment (non-glare treatment) applied to its surface, or the one having a protective layer of e.g. an acrylic resin, a polycarbonate resin or cellulose acetate formed thereon. Further, it may be the one having a hard coating layer of a silicone type or acrylic type formed thereon.

The light diffusing film may be the one prepared by applying embossing treatment to the surface of a transparent resin film, or the one prepared by embedding in the interior or to the surface of a film a light diffusing material having a refractive index different from the refractive index of the film material. Otherwise, it may be a film made of a polymer obtained by polymerizing a mixture of at least two monomers having different refractive indices.

When an interlayer of a resin having a refractive index higher than refractive index of the above described resin having self-healing properties and scuff resistance, is provided between the antireflection layer of a non-crystalline fluorine-containing polymer and the layer of the resin having self-healing properties and scuff resistance, better antireflection effects can be obtained.

The resin having a high refractive index is preferably a polymer having aromatic rings in its main chain or side chains, such as polystyrene, poly(o-chlorostyrene), poly(2,6-dichlorostyrene), poly(bromostyrene), poly(2,6-dibromostyrene), polycarbonate, aromatic polyester, polysulfone, polyether sulfone, polyaryl sulfone, poly(pentabromophenyl methacrylate), a phenoxy resin or its brominated product, or an epoxy resin or its brominated product. Further, it is possible to modify the terminals of such resins with reactive functional groups, such as amide groups, amino groups, epoxy groups, hydroxy groups, carboxyl groups, (meth)acryloyl groups or silanol groups, to increase the adhesion to the substrate or to the layer made of the non-crystalline fluorine-containing polymer.

Among the above resins, the phenoxy resin and the epoxy resin have reactive hydroxyl groups in their molecules and already have active epoxy groups at the terminals without modification, and they are preferred as such from the viewpoint of the adhesive properties. The sulfone-type polymer such as polysulfone, polyether sulfone or polyaryl sulfone, is preferably a polymer containing sulfur atoms in its main chain. Further, an organic oxide such as $Al_2O_3$, $SnO_2$, $In_2O_3$, $Nd_2O_3$, $ZrO_2$, $TiO_2$, $Ta_2O_5$, $Y_2O_3$ or $CeO_2$ may also be preferably employed. Further, an additive such as a plasticizer or a binder may be incorporated thereto, as the case requires.

As the material for the film having self-healing properties and scuff resistance, a soft resin such as a polyurethane resin, an acrylic transparent rubber-like resin, a silicone rubber-like resin, an olefin-type or styrene-type elastomer, or a blend product or a polymer alloy thereof with other resins, may be used. However, a polyurethane resin is most preferred from the viewpoint of the balance of the transparency, the self-healing properties and the scuff resistance. The thickness of the film may be determined depending upon the properties required for the article to be used and is not particularly limited.

As an index for the self-healing properties, it is desirable that "the self-healing property as measured by a HEIDON scratch tester at 23° C. under a relative humidity of 50% using a diamond chip having the forward end diameter of 15 μm as a scratching tool" (hereinafter referred to simply as the self-healing property) is at least 10 g.

As an index for the scuff resistance, it is desirable that "the haze increase after 100 rotations by a Taber abrasion test conducted under a load of 500 g using CS-10F as the truck wheel at 23° C. under a relative humidity of 50%" (hereinafter referred to simply as the haze increase) is preferably less than 10%.

The polyurethane resin is preferably the one disclosed in Japanese Unexamined Patent Publication No. 56717/1989. Particularly preferred from the viewpoint of yellowing resistance, is a non-yellowing polyurethane resin. The non-yellowing polyurethane resin is a polyurethane resin prepared by using a polyol and a non-aromatic polyisocyanate having no isocyanate group directly bonded to an aromatic nucleus, as the starting materials. The film surface may have fine irregularities to avoid reflection due to light scattering. As the molding method, extrusion molding, injection molding, blow molding, cast molding or calendar molding may be employed. Particularly preferred is a reactive casting method from the viewpoint of the optical quality of the resulting film relating to a distortion of an image, or from such a viewpoint that even a crosslinkable resin can be thereby molded. As the polyurethane resin having self-healing properties and scuff resistance, which is obtainable by the reactive casting method, a linear resin (thermoplastic resin) or a crosslinkable resin (thermosetting resin) may be available. However, a crosslinkable resin is preferred from the viewpoint of the chemical resistance, stain resistance and durability.

The urethane resin obtainable by the reactive casting method may be formed into a film by mixing a polyol, a hydroxyl group terminal composition such as a chain extender and a polyisocyanate, followed by coating and curing on a substrate to form a film. As such a polyol, a polyether type, polyester type or polycarbonate type polyol may be used. From the viewpoint of the durability, the price, and the balance of the strength, scuff resistance and self-healing properties, a polyester type polyol is preferred. The number of functional groups is required to be larger than 1 on average and preferably from 2 to 3 from the viewpoint of the balance of the strength, elongation, self-healing properties and scuff resistance. Further, a chain extender may be employed, as the case requires. As the chain extender, a short chain diol, a short chain polyol, a short chain diamine or a short chain polyamine, may be employed. From the viewpoint of the transparency and flexibility, a short chain diol is preferred.

As the polyisocyanate, an aromatic diisocyanate, an aromatic polyisocyanate, an aliphatic diisocyanate, an aliphatic polyisocyanate, an alicyclic diisocyanate, or an alicyclic polyisocyanate, may, for example, be used. From the viewpoint of yellowing resistance, an aliphatic or alicyclic diisocyanate or polyisocyanate is more preferred. These starting materials may be used alone or in combination as a mixture. Further, a stabilizer such as an ultraviolet absorber, an antioxidant or a photostabilizer, or an additive such as a urethane-modified catalyst, an extender, a coloring agent or a flame retardant may be incorporated, as the case requires. Further, a color or a pattern may be applied, as the case requires. Such a color or a pattern may be applied by adding a colorant directly to the film or by printing, or by bonding or laminating a new film having a color or a pattern.

In the present invention, the polyurethane soft resin film may be a single layer film or a laminated film. In the case of a laminated film, at least one of the surface layers is required to be a polyurethane soft resin.

As a method for applying antireflection treatment to the surface of an optical article, it is common to coat a layer of a resin having self-healing properties and scuff resistance or to bond a film of such a resin, followed by coating further an antireflection layer of a non-crystalline fluorine-containing polymer. Otherwise, a method may be employed wherein a resin film having self-healing properties and scuff resistance, having an antireflection layer of a non-crystalline fluorine-containing polymer preliminarily coated, is bonded to the surface of an optical article. The antireflection layer may be a single layer composed solely of a non-crystalline fluorine-containing polymer, or a combination of multilayers of materials having different refractive indices, as the case requires.

With respect to an antireflection layer utilizing light interference of a thin film, the thickness of the layer is optically strictly designed. For example, in the case of a single layer coating of a polymer having fluorine-containing aliphatic ring structures, the thickness $d_1$ of this polymer layer is represented by $d_1 = (2m_1 - 1) \cdot \lambda/(4n_1)$ where $n_1$ is the refractive index of this polymer and $\lambda$ is the wavelength of the light in question. Here, $m_1$ is a positive integer and is preferably $m_1 = 1$ in order to reduce the reflection within a wide range of wavelengths. The thickness $d_1$ is usually from 10 to 1,000 nm, preferably from 20 to 500 nm, not to impair the functions of the layer of a resin having self-healing properties and scuff resistance.

When an interlayer of a resin having a refractive index higher than the refractive index of the above-mentioned resin having self-healing properties and scuff resistance is provided between the antireflection layer of a non-crystalline fluorine-containing polymer and the layer of the resin having self-healing properties and scuff resistance, the condition required for the thickness $d_1$ is the same as in the case where no such interlayer is present. The thickness $d_2$ of the resin layer having a high refractive index is represented by $d_2 = (2m_2 - 1) \cdot \lambda/(4n_2)$ where $n_2$ is the refractive index of this resin. Here, $m_2$ is a positive integer and is preferably $m_2 = 1$, for the same reason as for $m_1$. Under this condition, the antireflection effects are highest against the light with a wavelength of $\lambda$. However, the thickness may be adjusted to be $d_2 = (2m_{2-1}) \cdot \lambda/(2n_2)$ to make the invention applicable to a wider range of wavelengths, or may be designed to be other intermediate thicknesses. The thickness $d_2$ is usually from 10 to 1,000 nm, preferably from 20 to 500 nm, not to impair the functions of the layer of a resin having self-healing properties and scuff resistance.

The deviation of the real layer thickness from the designed value is preferably within a range of $\pm 10\%$, more preferably within a range of $\pm 5\%$, to attain the predetermined antireflection performance. Further, the variation in the layer thickness in the same plane is preferably within a range of $\pm 5\%$, more preferably within a range of $\pm 3\%$, since if the variation is large, the color of the reflected lights will be non-uniform, whereby the appearance will be impaired.

The effects of the interlayer will be observed when $n_2 > n_3$, where $n_2$ is the refractive index of the interlayer, and $n_3$ is the refractive index of the resin having self-healing properties and scuff resistance. If $d_2 = (2m_2 - 1) \cdot \lambda/(4n_2)$ is employed, the highest antireflection effects can be obtained when $n_2 = n_1 \cdot (n_3)^{1 \cdot 2}$. On the other hand, if $d_2 = (2m_{2-1}) \cdot \lambda/(2n_2)$ is employed, the highest antireflection effects can be obtained when $n_2 = n_1 \cdot n_1$.

In the present invention, there is no particular restriction as to the method for forming the antireflection layer, and any optional processing method may be selected for use. For example, a polymer having fluorine-containing aliphatic ring structures, is soluble in a certain specific fluorine-type solvent, and by coating a solution of this polymer, it is readily possible to form an antireflection layer having a predetermined layer thickness.

As the coating method, dip coating, roll coating, spray coating, gravure coating, comma coating or die coating may, for example, be selected. By these coating methods, continuous processing is possible, whereby the productivity is excellent as compared with a vapor deposition method of a batch type. The solvents which can be used for such coating methods, include fluorine-type solvents, for example, a perfluoroalkane such as $C_nF_{2n+2}$ (n:6–12), a perfluoroamine such as $(C_nF_{2n+1})_3N$ (n:3–5), $CF_3(CF_2)_nCH=CH_2$ (n:5–11), $CF_3(CF_2)_mCH_2CH_3$ (m:5–11), and perfluoro(2-butyltetrahydrofuran). Among them, perfluoroctane or perfluoro(2-butyltetrahydrofuran) is preferably employed for dip coating or die coating from the viewpoint of e.g. the boiling point (about 100° C.), and particularly for the die coating method, such a solvent is preferably employed alone or in combination with perfluorotributylamine. In order to increase the adhesion of the polymer having fluorine-containing aliphatic ring structures to the surface of an optical article, corona discharge treatment, treatment with active energy rays such as ultraviolet treatment, or primer treatment may be preliminarily applied to the surface of the article.

Also in a case where an interlayer of a resin having a refractive index higher than the refractive index of the above-mentioned resin having self-healing properties and scuff resistance, is provided between the antireflection layer of a non-crystalline fluorine-containing polymer and the layer of the resin having self-healing properties and scuff resistance, it is effective to apply corona discharge treatment, treatment with active energy rays such as ultraviolet treatment, or primer treatment preliminarily to the interlayer in order to increase the adhesion.

In the present invention, when the antireflection film comprising a layer of a resin having self-healing properties and scuff resistance, and an antireflection layer of a non-crystalline fluorine-containing polymer, is used, this film may be bonded or adhered to the surface of an optical article, so that the article will have a bonding layer or an adhesive layer. Further, in order to increase the adhesion between the surface of the optical article and the layer of the resin having self-healing properties and scuff resistance, in order to increase the adhesion between this layer and the interlayer or the antireflection layer of the non-crystalline fluorine-containing polymer, or in order to increase the adhesion between the interlayer and the antireflection layer of the non-crystalline fluorine-containing polymer, it is effective to incorporate a silane coupling agent into at least one of the three layers. High effects can be obtained particularly when it is incorporated to the antireflection layer of the non-crystalline fluorine-containing polymer.

Such a silane coupling agent may be selected within a wide range of silane coupling agents including those known or well known heretofore. For example, a monoalkoxysilane such as vinyltriethoxysilane, trimethylmethoxysilane, trimethylethoxysilane, dimethylvinylmethoxysilane or dimethylvinylethoxysilane, may be mentioned.

Further, a dialkoxysilane such as γ-chloropropylmethyldimethoxysilane, γ-chloropropylmethyldiethoxysilane, γ-aminopropylmethyldiethoxysilane, γ-aminopropylmethyldimethoxysilane, N-β-(aminoethyl)-γ-aminopropylmethyldimethoxysilane, N-β-(aminoethyl)-γ-aminopropylmethyldiethoxysilane, γ-glycidoxypropylmethyldimethoxysilane, γ-glycidoxypropylmethyldiethoxysilane, γ-methacryloxypropylmethyldimethoxysilane, methyldimethoxysilane, methyldiethoxysilane, dimethyldimethoxysilane, dimethyldiethoxysilane, methylvinyldimethoxysilane, methylvinyldiethoxysilane, diphenyldimethoxysilane, diphenyldiethoxysilane, 3,3,3-trifluoropropylmethyldimethoxysilane, 3,3,4,4,5,5,6,6,7,7,8,8-tridecafluorooctylmethyldimethoxysilane, or 3,3,4,4,5,5,6,6,7,7,8,8,9,9,10,10,10-heptadecafluorodecylmethyldimethoxysilane, may be mentioned. Further, a tri- or tetra-alkoxysilane such as γ-aminopropyltrimethoxysilane, γ-aminopropyltriethoxysilane, N-β-(aminoethyl )-γ-aminopropyltrimethoxysilane, N-β-(aminoethyl )-γ-aminopropyltriethoxysilane, γ-mercaptopropyltrimethoxysilane, γ-glycidoxypropyltrimethoxysilane, γ-glycidoxypropyltriethoxysilane, γ-methacryloxypropyltrimethoxysilane, γ-chloropropyltrimethoxysilane, methyltriethoxysilane, phenyltrimethoxysilane, phenyltriethoxysilane, 3,3,3-trifluoropropyltrimethoxysilane, 3,3,4,4,5,5,6,6,7,7,8,8,8-tridecafluorooctyltrimethoxysilane, 3,3,4,4,5,5,6,6,7,7,8,8,9,9,10,10,10-heptadecafluorodecyltrimethoxysilane, tetramethoxysilane, or tetraethoxysilane, may be mentioned.

These alkoxysilanes may be used alone or in combination as a mixture. Among them, an alkoxysilane having an amino group such as γ-aminopropyltriethoxysilane, γ-aminoproylmethyldiethoxysilane, γ-amionpropyltrimethoxysilane, γ-aminopropylmethyldimethoxysilane, N-β-(aminoethyl)-γaminopropyltrimethoxysilane, N-β-(aminoethyl)-γ-aminopropylmethyldimethoxysilane, N-β-(aminoethyl)-γ-aminopropyltriethoxysilane or N-β-(aminoethyl)-γ-aminopropylmethyldiethoxysilane, or an alkoxysilane having an epoxy group such as γ-glycidoxypropyltrimethoxysilane, γ-glycidoxypropylmethyldimethoxysilane, γ-glycidoxypropyltriethoxysilane or γ-glycidoxypropylmethyldiethoxysilane, may, for example, be mentioned as particularly preferred to improve the adhesiveness of the fluorine-containing polymer without. impairing the transparency of the fluorine-containing polymer.

In the present invention, an antireflection film containing a polyurethane soft resin film as an essential constituting layer, is preferred, and it may be used as adhered to a polarizing film or to a character or image information display, or as adhered to other films or sheets. As the display, CRT, LCD, a projection display, a plasma display, a LED display or an ECD display may, for example, be mentioned, and such an antireflection film may contribute to prevention of reflection of external lights, improvement of the luminance or improvement of the contrast. With a substantial thickness, such a film can contribute also to improvement of the strength of the display body or to prevention of scattering.

The method for attaching it to other films or sheets, is not particularly limited, and a method such as bonding, adhering or heat fusion may suitably be selected. Such an antireflection film or sheet can contribute to improvement of the above-mentioned visibility when disposed in front of a display, for example, as a CRT filter, a CLC protective panel or a front panel for the projection image screen, and it is also useful as a touch panel.

Now, the present invention will be described in further detail with reference to Examples. However, it should be understood that the present invention is by no means restricted by such specific Examples.

PREPARATION EXAMPLE 1

35 g of perfluoro(butenylvinyl ether), 150 g of deionized water and 90 mg of $((CH_3)_2CHOCOO)_2$ as a polymerization initiator, were charged into a pressure resistant glass autoclave having an internal capacity of 200 cc. The interior of the system was flushed three times with nitrogen, and then suspension polymerization was conducted at 40° C. for 22 hours, to obtain 28 g of polymer A. The intrinsic viscosity $[\eta]$ of this polymer was 0.50 as measured at 30° C. in perfluoro(2-butyltetrahydrofuran). The glass-transition temperature of the polymer was 108° C., and it was a glass-like polymer which was tough and transparent at room temperature. Its 10% heat decomposition temperature was 465° C.. Its refractive index was as low as 1.34, and its light transmittance was as high as at least 95%. This polymer was dissolved in perfluorooctane in an amount of 1.5 wt % to obtain a solution A.

PREPARATION EXAMPLE 2

Perfluoro(2,2-dimethyl-1,3-dioxol) and perfluoro(-butenylvinyl ether) were subjected to radical-copolymerization to obtain copolymer B having a glass transition temperature of 230° C. This polymer was colorless transparent, and its refractive index was as low as 1.3, and its transmittance was high. This copolymer was dissolved in perfluorooctane in an amount of 1 wt % to obtain a solution B.

PREPARATION EXAMPLE 3

1 part by weight of a perfluoro polyether (number average molecular weight: 4,000) of the formula $OCNCH_2C_4F_8CH_2NHCOOCH_2Y\text{—}[(OCFR_2CF_2)_s\text{—}(OCF_2CF_2)_t\text{—}(OCF_2)_u]_n\text{—}YCH\text{—}CH_2OCONHCH_2\text{—}C_4F_8CH_2NCO$ (wherein Y is a perfluoroaliphatic group, $R^2$ is $CF_3$, and each of s, t, u and n is an integer), 2 parts by weight of perfluorooctylethane and 0.27 part by weight of octafluorohexamethylene diisocyanate, were reacted at 50° C. for 10 hours to obtain a solution of polymer C. This solution was diluted by perfluorooctane to obtain a solution C having a solid content of 1 wt %.

PREPARATION EXAMPLE 4

A urethane film was prepared in the following manner. Namely, a blend composition as identified in the upper part of Table 1, was melted and mixed under heating at 80° C. for 3 hours to obtain a uniform polyol system liquid. On the other hand, a blend composition as identified in the lower part of Table 1, was melted and mixed under heating at 80° C. for 3 hours to obtain a uniform isocyanate system liquid. This polyol system liquid and the isocyanate system liquid were mixed in a ratio of 100:90.41, and a polyurethane-type soft resin film D having a thickness of 0.3 mm, was prepared by a reactive casting method. The urethane film thus obtained had a haze increase of 1.5% and a self-healing property of 150 g.

TABLE 1

| | |
|---|---|
| Polycaprolactonetriol having a hydroxyl value of 196.4 | 50.00 parts by weight |
| Polycaprolactonetriol having a hydroxyl value of 540.3 | 40.00 parts by weight |
| Polycaprolactonediol having a hydroxyl value of 37.6 | 9.60 parts by weight |
| Silicone-type extender (BYK-300) | 0.40 part by weight |
| Nuleate-modified hexamethyleneisocyanate having a NCO content of 21.4% | 90.00 parts by weight |
| Isophorone diisocyanate | 5.00 parts by weight |
| Hydrogenated MDI | 5.00 parts by weight |
| Dibutyltin dilaurate | 0.06 part by weight |

PREPARATION EXAMPLE 5

An aromatic polyester (U-100, manufactured by Yunitika) was dissolved in chloroform in an amount of 1 wt % to obtain a solution E. The refractive index of the aromatic polyester was 1.61, which was higher than the refractive index of the film D.

PREPARATION EXAMPLE 6

A brominated phenoxy resin (phenotote YPB-43C, manufactured by Toto Kasei, molecular weight: about 60,000), was dissolved in 1,1,2,2-tetrachloroethane in an amount of 1.0 wt % to obtain a solution F. The refractive index of the brominated phenoxy resin was 1.63 which was higher than the refractive index of the film D.

PREPARATION EXAMPLE 7

The polymer obtained in Example 2[was dissolved in perfluorooctane in an amount of 2.0 wt %, and γ-aminopropyldiethoxymethylsilane was mixed in a proportion of 0.075 g per 100 g of this solution to obtain a solution G.

EXAMPLE 1

Corona discharge treatment was applied to the surface of the film D. Then, the film was dipped in the solution A and then vertically pulled up at a speed of 200 mm/min, followed by heating at 120° C. for 10 minutes to coat a thin film of the polymer A on each side of the film D. Then, the coated film on the rear side was wiped off by means of perfluorooctane to obtain a film having a thin film of the polymer A coated only on its front side. The thickness of the coated layer was 100 nm. The rear side of this film was adhered to the surface of a polarizing film (Sumikaran SH1832AP, manufactured by Sumitomo Chemical Co., Ltd.) to obtain a polarizing film having antireflection properties. The reflectance of the adhered side was measured, whereby the reflectance of the polarizing film was 4% before the adhesion, but decreased to 0.8% after adhesion. Further, the self-healing property of the antireflection side was 100 g, and the haze increase was 0.5%.

EXAMPLE 2

Corona discharge treatment was applied to the surface of the film D. Then, the film was dipped in the solution B and then vertically pulled up at a speed of 200 mm/min, followed by heating at 120° C. for 10 minutes to coat a thin film of the polymer B on each side of the film D. Then, the coated film on the rear side was wiped off with perfluorooctane to obtain a film having a thin layer of the polymer B coated only on the front side. The thickness of the coated layer was 110 nm. The rear side of this film was adhered to a LCD surface, whereby the reflection of the external lights was reduced, and the visibility was improved.

EXAMPLE 3

Corona discharge treatment was applied to the surface of the film D. Then, the film was dipped in the solution A and then vertically pulled up at a speed of 200 mm/min, followed by heating at 120° C. for 10 minutes to coat a thin layer of the polymer A on each side of the film D. Then, the coated layer on the rear side was wiped off with perfluorooctane, to obtain a film having a thin layer of polymer A coated only on the front side. The thickness of the coated layer was 100 nm. The rear side of this film was adhered to a transparent acrylic plate, and the reflectance was measured. The reflectance of the transparent acrylic plate itself before the adhesion was 4%. Whereas, the reflectance after the adhesion was as low as 0.8%. The self-healing property of the antireflection side was 100 g, and the haze increase was 0.4%.

EXAMPLE 4

Corona discharge treatment was applied to the surface of the film D. Then, the film was dipped in the solution E and then vertically pulled up at a speed of 200 mm/min, followed by heating at 120° C. for 10 minutes to coat a high refractive index layer of an aromatic polyester on each side of the film D. Then, the coated layer on the rear side was wiped off with chloroform, to obtain a film having a thin layer of an aromatic polyester coated only on the front side. This film was further dipped in the solution A, and then vertically pulled up at a speed of 200 mm/min, followed by heating at 120° C. for 10 minutes, to coat a thin layer of the polymer A on each side of the film. Then, the coated layer on the rear side was wiped off with perfluorooctane to obtain a film having double thin layers i.e. 85 nm of the aromatic polyester and 105 nm of the polymer A, coated only on the front side. The rear side of this film was adhered to the surface of a polarizing film (Sumikaran SH1832AP, manufactured by Sumitomo Chemical Co., Ltd.) to obtain a polarizing film having antireflection properties. The reflectance on the adhered side was measured, whereby the reflectance before the adhesion was 4%, but it reduced to 0.3% after the adhesion. The self-healing properties of the antireflection side was 100 g, and the haze increase was 0.4%.

EXAMPLE 5

Corona discharge treatment was applied to the surface of the film D. Then, the film was dipped into a solution F and then vertically pulled up at a speed of 200 mm/min, followed by heating at 70° C. for 10 minutes, to coat a high refractive index layer of a brominated phenoxy resin on each side of the film D. Then, the coated layer on the rear side was wiped off with chloroform to obtain a film having a thin layer of the brominated phenoxy resin coated only on the front side. This film was further dipped in the solution A and then vertically pulled up at a rate of 200 mm/min, followed by heating at 120° C. for 30 minutes, to coat a thin film of the polymer A on each side of the film. Then, the coated layer on the rear side was wiped off with perfluorooctane, to obtain a film having double thin layers i.e. 85 nm of the brominated phenoxy resin and 105 nm of the polymer A, coated only on the front side. The rear side of this film was adhered to the surface of a polarizing film (Sumikaran SH1832AP, manufactured by Sumitomo Chemical Co. Ltd.) to obtain a polarizing film having antireflection properties. The reflectance on the adhered side was measured, whereby the reflectance was 4% before the adhesion, but decreased to 0.25% after the adhesion. The self-healing property of the antireflection side was 100 g, and the haze increase was 0.4%.

EXAMPLE 6

Corona discharge treatment was applied to the surface of the film D. Then, the film was dipped in the solution F and then vertically pulled up at a speed of 200 mm/min, followed by heating at 70° C. for 10 minutes, to coat a high refractive index layer of a brominated phenoxy resin on each side of the film D. Then, the coated layer on the rear side was wiped off with chloroform, to obtain a film having a thin layer of the brominated phenoxy resin coated only on the front side. This film was further dipped in the solution G and then vertically pulled up at a rate of 100 mm/min, followed by heating at 120° C. for 20 minutes, to coat a thin layer of the polymer A on each side of the film. Then, the coated layer on the rear side was wiped off with perfluorooctane, to obtain a film having double thin layers i.e. 85 nm of the brominated phenoxy resin and 105 nm of the solid content of the solution G, coated only on the front side. The rear side of this film was adhered to the surface of the polarizing film (Sumikaran SH1832AP, manufactured by Sumitomo Chemical Co., Ltd.) to obtain a polarizing film having antireflection properties. The reflectance of the adhered side, was measured, whereby the reflectance was before the adhesion, but decreased to 0.25% after the adhesion. The self-healing property of the antireflection side was 100 g, and the haze increase was 0.4%.

EXAMPLE 7

Corona discharge treatment was applied to the surface of the film D. Then, the film was dipped in the solvent C and then vertically pulled up at a speed of 200 mm/min, followed by heating at 120° C. for 10 minutes to coat a thin layer of the polymer C on each side of the film D. Then, the coated layer on the rear side was wiped off with perfluorooctane, and the coated film was further heated at 150° C. for 30 minutes, to obtain a film having a thin layer of the polymer C coated only on the front side. The thickness of the coated layer was 100 nm. The rear side of this film was adhered to the surface of LCD, whereby reflection of external lights was reduced, and the visibility was improved.

COMPARATIVE EXAMPLE 1

Corona discharge treatment was applied to the surface of the film D. Then, the solution A was coated thereon by a knife coater and dried at 80° C. for 10 hours and further at 130° C. for two hours, to coat a thin layer of the polymer A in a thickness of 2 μm on one side of the film D. The rear side of this film was adhered to the surface of a polarizing film (Sumikaran SH1832AP, manufactured by Sumitomo Chemical Co., Ltd.). The self-healing property of this film was 0 g, and the haze increase was 10%. Further, the reflectance was 4% with the polarizing film before adhesion, and did not lower beyond 2.1% after the adhesion.

COMPARATIVE EXAMPLE 2

A polarizing film (Sumikaran SH1832AP) was dipped in the solution A and then vertically pulled up at a speed of 200 mm/min, followed by heating at 70° C. for 10 minutes, to coat a 100 nm thin layer of the polymer A on each side of the film. The self-healing property of this film was 0 g, and the haze increase was 15%.

According to the present invention, it is possible to impart antireflection properties, self-healing properties and scuff resistance to the surface of an optical article by a simple method.

What is claimed is:

1. An optical article comprising a layer of a transparent resin having a self-healing property of at least 10 g as measured by a Heidon scratch tester at 23° C. under a relative humidity of 50% using a diamond chip having a forward end diameter of 15 μm as a scratching tool and scuff resistance as measured by the haze increase after 100 rotations by a Taber abrasion test conduct under a load of 500 g using CS-10F as the truck wheel at 23° C. under a relative humidity of 50% of less than 10%, and an antireflection layer consisting essentially of a non-crystalline fluorine-containing polymer, wherein the non-crystalline fluorine-containing polymer is a polymer having fluorine-containing aliphatic ring structures, or a perfluoropolyether, and the antireflection layer has a thickness of from 10 to 1,000 nm.

2. The optical article according to claim 1, which is a light diffusing film.

3. The optical article according to claim 1, which is a polarizing film.

4. The optical article according to claim 1, which is a character or image information display.

5. The optical article according to claim 1, wherein the resin having self-healing properties and scuff resistance, is a polyurethane resin.

6. The optical article according to claim 5, wherein the polyurethane resin is a crosslinked polyurethane resin.

7. The optical article according to claim 1, which has an interlayer of a resin having a refractive index higher than the refractive index of the resin having self-healing properties and scuff resistance, between the layer of the resin having self-healing properties and scuff resistance and the antireflection layer of a non-crystalline fluorine-containing polymer.

8. The optical article according to claim 7, wherein the interlayer is made of a resin containing aromatic rings in its main chain or side chains.

9. The optical article according to claim 1, which is an anti-reflection film or sheet.

10. The optical article according to claim 1, wherein the antireflection layer has a thickness of from 20 to 500 nm.

11. The optical article according to claim 10, wherein the resin having self-healing properties and scuff resistance is a polyurethane resin.

12. The optical according to claim 11, wherein the polyurethane resin is a cross-linked polyurethane resin.

13. The optical article according to claim 10, further comprising an interlayer of a resin having a refractive index higher than the refractive index of the resin having self-healing properties and scuff resistance, between the layer of the resin having self-healing properties and scuff resistance and the antireflection layer of a non-crystalline fluorine-containing polymer.

14. The optical article according to claim 13, wherein the interlayer is made of a resin containing aromatic rings in its main chain or side chains.

* * * * *